Patented Jan. 5, 1943

2,307,696

UNITED STATES PATENT OFFICE 2,307,696

METHOD OF APPLYING COLD CEMENT GLAZE

James Carruthers Blair-McGuffie, Vauxhall, London, England

No Drawing. Application January 29, 1940, Serial No. 316,272. In Great Britain November 8, 1938

1 Claim. (Cl. 117—70)

This invention relates to the treatment of such materials as brick, stone, concrete or plaster for the purpose of producing thereon a glazed surface and the invention has for its object the provision of an improved composition which, when applied in the cold state, will provide a reflective wall decoration which is jointless, hard and washable.

The invention consists firstly in a glazing preparation for wall surfaces and the like comprising an aqueous mixture of Portland cement and soluble casein.

The invention consists secondly in a method of imparting a glazed surface to walls and the like including the steps of forming a solution of casein in water, in adding thereto a quantiy oft white Portland cement with or without a proportion of pigment, in sieving the mixture and spraying it on to the surface to be treated.

In carrying the invention into effect and according to a preferred manner thereof, the surface to be treated such as brickwork, concrete, or metal lathing is first scratched and then rendered and set with a sand and cement mixture of say three of sand to one of cement with as an integral ingredient a known waterproofing agent such as a siliceous powder or similar material and finished with a float in accordance with normal building practice. The purpose of this rendering is to provide a base having comparatively little suction and presenting a uniform texture and outline to which the cold cement glaze composition may be applied.

It has been found that if Portland cement be admixed with water soluble casein and water be added in such proportions as to produce a mixture of the consistency of cream, this mixture, when sprayed by any known spraying device upon a base as indicated will, upon hydration produce a hard film adhering firmly to the base and presenting a hard, smooth and permanently glazed surface.

In addition, by varying the strength of the mixture within a range in which the maximum glaze continues to be produced it is found that the rate of hydration of the cement can be adjusted to suit atmospheric conditions.

The following example, which illustrates the invention, shows the preferred ingredients, proportions, method of mixing and application:

Take ten litres of tap water at room temperature and to this add 7 grammes of water soluble casein and agitate until a uniform solution is obtained. The amount of casein to be added will depend upon the quality of the cement and the volume of water required to produce the right consistency for spraying may vary within relatively wide limits, as for instance between 2 to 10 grammes per ten litres of water. The cement employed is preferably a white quality to which is first added any desired pigment and the said cement is then wetted with aqueous solution of casein until a compound of the consistency of cream is produced. The creamy admixture is now sieved and is ready for application to the sand cement prepared surface.

The sand-Portland cement base already described is brushed over to remove loose particles of matter and damped down with water.

The spraying is then started and the manipulation of the spraying apparatus and mixture is similar to that employed in the spraying of paint allowing for the higher specific gravity and greater viscosity of the material according to the present invention being sprayed.

Within a few hours after the application of the sprayed material the glazed surface will be sufficiently hard to prevent adherence of dust and within three to four days, depending upon atmospheric conditions, the sprayed film will have hardened throughout.

In an alternative form the water soluble casein powder may be admixed with the cement; thus if 10 litres of water are employed to form the cement into a creamy consistency the cement used will have approximately 3 grammes of powdered casein admixed with it prior to being damped.

To provide a more water-repellent surface the sprayed film may, when dry, be sprayed, brushed or rubbed down with any known surface waterproofing medium for Portland cement but preferably an emulsion is employed consisting of a suspension of 234 grammes of beeswax in 5,000 c. c. of water to which 78 grammes of potassium carbonate and 175 grammes of fish glue have been added.

After the application of the waterproofing medium, the surface is again allowed to dry and is then polished with a dry cloth.

I claim:

The method of imparting a cold glazed surface to walls and the like made of brick, stone, concrete or plaster, which consists in forming on the wall surface an initial coating consisting of a mixture of sand and Portland cement containing a waterproofing agent, preparing a second coating mixture of water soluble casein, white Portland cement and water, sieving the second coating mixture, spraying the second coating mixture onto the surface of said initial coating, and finally treating the sprayed surface with a waterproofing medium for Portland cement consisting of water, beeswax, potassium carbonate and fish glue.

JAMES CARRUTHERS BLAIR-McGUFFIE.